3,035,035
PROCESS FOR THE PRODUCTION OF POLYPROPYLENE HAVING A LOWER MOLECULAR WEIGHT SUITABLE FOR MAKING FIBRES

Jitka Menšíková, 35a Kotlarska, and Rostislav Vilím, 10 Rysankova, both of Brno, Czechoslovakia
No Drawing. Filed Jan. 12, 1960, Ser. No. 1,845
Claims priority, application Czechoslovakia Jan. 12, 1959
4 Claims. (Cl. 260—93.7)

The new synthetic resin-polypropylene-finds applications not only in the plastics industry but also as a fibre-forming material in the textile industry. It is desirable—especially for textile purposes—to produce polymers having molecular weights lower than those obtained by current and described polymerization processes. Numerous polymerization processes for polypropylene production are known from the literature; however, when these processes are employed, the molecular weight can be controlled only within a narrow range, that is, within the range afforded by the choice of the polymerization temperature and the monomer concentration.

The present invention relates to a modification of the so-called Ziegler-type of polymerization of propylene, wherein in accordance with the present invention high crystalline polypropylene with a low molecular weight, corresponding to a viscosity value between 80 ml./g. and 400 ml./g. is produced.

We succeeded in finding a novel method of controlling the molecular weight of polypropylene within wide limits which is independent of the above-mentioned factors. It consists in the addition of anhydrous salts of zinc, cadmium, mercury (II), calcium and magnesium—and especially of the halides (Cl, Br, I, F) of the named metals—into the mixture to be polymerized; this is the object of the present invention.

The molecular weight of the polymer so produced is decreased in comparison with the commonly obtainable values in proportion to the amount of the metal compound added. The catalytic system employed may comprise either TiCl$_3$ and trialkylaluminium (with a shorter alkyl chain), especially triethylaluminium as is indicated by patents issued to G. Natta, or it may comprise TiCl$_3$ prepared by the reduction of TiCl$_4$ by certain metals (e.g. by aluminium metal) and triethylaluminium. TiCl$_3$ may be present either in its pure form of mixed crystals with other metals. The polymerization of propylene is usually carried out in the presence of a hydrocarbon-type solvent.

The great advantage of the molecular weight modifiers herein described consists in that they affect practically neither the rate of polymerization nor the content of the crystalline matter (with the exception of HgCl$_2$ in which case the crystallinity ratio decreases with increasing concentration of the said salt).

Tables 1 and 2 show the dependence of the molecular weight of the resulting polymer (expressed as the so-called "viscosity value" which is proportional to the molecular weight) on the amount of the divalent metal salt added. The viscosity value is defined as $$\frac{1}{c} \ln \frac{\tau}{\tau_0}$$

where $c$, the polymer concentration, is equal to 0.001 g./ml. of solution, $\tau$ is the flow time of the polymer solution in a given viscometer and $\tau_0$ is the flow time of the pure solvent, measured in tetrahydronaphthalene solution at 140° C. Using the procedure forming the object of the present invention polypropylene may be produced with a molecular weight corresponding to a viscosity value between 80 and 400 ml./g.

TABLE 1

| Experiment No. | Metal salt added | Metal salt, Al(C$_2$H$_5$)$_3$ ratio | Viscosity value, ml./g. | Crystallinity ratio, percent |
|---|---|---|---|---|
| 1 | ZnCl$_2$ | 0 | 391 | 86.4 |
| 2 | | 0.019 | 352 | 87.0 |
| 3 | | 0.091 | 213 | 84.5 |
| 4 | | 0.438 | 194 | 86.1 |
| 5 | CdBr$_2$ | 0 | 380 | 84.6 |
| 6 | | 0.045 | 198 | 86.5 |
| 7 | | 0.201 | 62 | 86.5 |
| 8 | HgCl$_2$ | 0 | 472 | 83.6 |
| 9 | | 0.087 | 290 | 80.6 |
| 10 | | 0.273 | 172 | 71.5 |
| 11 | CaCl$_2$ | 0 | 472 | 83.6 |
| 12 | | 0.336 | 313 | 81.8 |

TABLE 2

| Experiment No. | Metal salt added | Metal salt, Al(C$_2$H$_5$)$_3$ ratio | Viscosity value, ml./g. | Crystallinity ratio, percent |
|---|---|---|---|---|
| 1 | ZnCl$_2$ | 0 | 380 | 85.5 |
| 2 | | 0.005 | 290 | 84.5 |
| 3 | | 0.039 | 166 | 81.2 |
| 4 | | 0.173 | 113 | 80.2 |
| 5 | CdCl$_2$ | 0 | 338 | 78.0 |
| 6 | | 0.047 | 221 | 76.5 |
| 7 | | 0.201 | 147 | 77.7 |
| 8 | | 0.405 | 101 | 79.3 |
| 9 | HgCl$_2$ | 0 | 338 | 78.0 |
| 10 | | 0.279 | 168 | 69.0 |
| 11 | | 0.457 | 131 | 56.7 |
| 12 | MgCl$_2$ | 0 | 340 | 75.2 |
| 13 | | 0.136 | 324 | 75.1 |
| 14 | | 0.605 | 233 | 72.0 |
| 15 | ZnI$_2$ | 0 | 340 | 77.4 |
| 16 | | 0.389 | 286 | 70.5 |
| 17 | zinc acetate | 0 | 313 | 74.0 |
| 18 | | 0.133 | 200 | 70.6 |
| 19 | | 0.667 | 172 | 70.0 |

Results shown in Tables 1 and 2 were obtained by polymerizing propylene according to procedures described in examples. Experiments reported in Table 1 were carried out using pure TiCl$_3$; those referred to in Table 2 were carried out using TiCl$_3$ obtained by the reduction of TiCl$_4$ with aluminium metal.

Examples (1) A glass ampoule was charged with 32.2 ml. of n-heptane, 16.3 mg. of ZnCl$_2$, 59.5 mg. of TiCl$_3$, 150 mg. of triethylaluminium and 4800 mg. of propylene. Polymerization was carried out at 45° C. for 220 minutes under stirring. The yield was 3170 mg. of polymer having a viscosity value of 213 ml./g. and a crystallinity ratio of 84.5%.

(2) A glass ampoule was charged with 32.2 ml. of n-heptane, 16.4 mg. of ZnBr$_2$, 59.5 mg. of TiCl$_3$ containing approximately 25% of AlCl$_3$ in the form of mixed crystals, 350 mg. of triethylaluminium and 4800 mg. of propylene. Polymerization was carried out at 45° C. for 100 minutes under stirring. The yield was 2980 mg. of polymer having a viscosity value of 166 ml./g. and a crystallinity ratio of 81.5%.

(3) A polymerization dilatometer was charged with 28.0 ml. of n-heptane, 93.5 mg. of triethylaluminium, 19.6 mg. of titanium trichloride containing 15% of aluminium trichloride in the form of mixed crystals, 50 mg. of zinc acetate and 4990 mg. of propylene. Polymerization was carried out at 45° C. for 60 minutes. The yield was 2070 mg. of polymer having a viscosity value of 179 ml./g. and a crystallinity ratio of 75%. Polypropylene obtained in the same conditions but without the addition of the zinc salt had a viscosity value of 313 ml./g. and a crystallinity ratio of 79.0%.

(4) A polymerization dilatometer was charged with 28.0 ml. of n-heptane, 47 ml. of MgCl₂, 93.5 mg. of triethylaluminium, 19.6 mg. of TiCl₃ and 5000 mg. of propylene. 2300 mg. of polymer having a viscosity value of 233 ml./g. and a crystallinity ratio of 72% were obtained after 48 minutes of polymerization carried out at a temperature of 45° C.

We claim:

1. The method of producing polypropylene of low molecular weight corresponding to a viscosity value, defined as $$\frac{1}{c} \ln \frac{t}{t_0}$$

wherein $t$ is the flow time of a polymer solution of concentration $c$ and $t_0$ is the flow time of the pure solvent which is tetrahydronaphthalene at 140° C. and the concentration $c$ is 0.001 g./ml., of between about 80 and 400 ml./g. while having a high degree of crystallinity and thereby being suitable for the formation of textile fibers, which comprises subjecting propylene in catalytic contact with titanium trichloride, triethyl aluminum, and with an anhydrous halide of a divalent metal selected from the group consisting of zinc, cadmium, mercury, calcium and magnesium in an amount of from 0.01 to 1 mol per each mol of said triethyl aluminum to polymerization, thereby forming a low molecular weight polypropylene of high crystallinity suitable for textile fiber formation.

2. The method of producing polypropylene of low molecular weight corresponding to a viscosity value, defined as $$\frac{1}{c} \ln \frac{t}{t_0}$$

wherein $t$ is the flow time of a polymer solution of concentration $c$ and $t_0$ is the flow time of the pure solvent which is tetrahydronaphthalene at 140° C. and the concentration $c$ is 0.001 g./ml., of between about 80 and 400 ml./g. while having a high degree of crystallinity and thereby being suitable for the formation of textile fibers, which comprises subjecting propylene in catalytic contact with titanium trichloride, triethyl aluminum, and with an anhydrous halide of a divalent metal selected from the group consisting of zinc, cadmium, mercury, calcium and magnesium in an amount of from 0.01 to 1 mol per each mol of said triethyl aluminum to polymerization and in further contact with an anhydrous organic solvent, thereby forming a low molecular weight polypropylene of high crystallinity suitable for textile fiber formation.

3. The method of producing polypropylene of low molecular weight corresponding to a viscosity value, defined as $$\frac{1}{c} \ln \frac{t}{t_0}$$

wherein $t$ is the flow time of a polymer solution of concentration $c$ and $t_0$ is the flow time of the pure solvent which is tetrahydronaphthalene at 140° C. and the concentration $c$ is 0.001 g./ml., of between about 80 and 400 ml./g. while having a high degree of crystallinity and thereby being suitable for the formation of textile fibers, which comprises subjecting propylene in catalytic contact with titanium trichloride, triethyl aluminum, and with an anhydrous halide of a divalent metal selected from the group consisting of zinc, cadmium, mercury, calcium and magnesium in an amount of from 0.01 to 1 mol per each mol of said trialkyl aluminum to polymerization and in further contact with an anhydrous organic solvent at a temperature of about 45° C., thereby forming a low molecular weight polypropylene of high crystallinity suitable for textile fiber formation.

4. The method of producing polypropylene of low molecular weight corresponding to a viscosity value, defined as $$\frac{1}{c} \ln \frac{t}{t_0}$$

wherein $t$ is the flow time of a polymer solution of concentration $c$ and $t_0$ is the flow time of the pure solvent which tetrahydronaphthalene at 140° C. and the concentration $c$ is 0.001 g./ml., of between 80 and 400 ml./g. while having a high degree of crystallinity and thereby being suitable for the formation of textile fibers, which comprises subjecting propylene in catalytic contact with titanium trichloride, triethyl aluminum, and zinc chloride in an amount of from 0.01 to 1 mol per each mol of said triethyl aluminum to polymerization, thereby forming a low molecular weight polypropylene of high crystallinity suitable for textile fiber formation.

References Cited in the file of this patent

UNITED STATES PATENTS

| | | |
|---|---|---|
| 2,886,561 | Reynolds et al. | May 12, 1959 |
| 2,909,511 | Thomas | Oct. 20, 1959 |
| 2,935,542 | Sherwood et al. | May 3, 1960 |
| 2,980,664 | Stuart | Apr. 18, 1961 |
| 2,981,725 | Luft et al. | Apr. 25, 1961 |

FOREIGN PATENTS

| | | |
|---|---|---|
| 526,101 | Italy | Aug. 4, 1955 |
| 1,137,020 | France | Jan. 7, 1957 |
| 798,447 | Great Britain | July 23, 1958 |